United States Patent
Kurita et al.

[11] 3,974,274
[45] Aug. 10, 1976

[54] PROCESS FOR PREPARING A CYCLODEXTRIN DERIVATIVE

[75] Inventors: Hironori Kurita; Mitsutaka Kawazu, both of Urawa; Kohki Takashima, Tokyo, all of Japan

[73] Assignee: Tanabe Seiyaku Co., Ltd., Osaka, Japan

[22] Filed: May 22, 1974

[21] Appl. No.: 472,377

[30] Foreign Application Priority Data
Dec. 23, 1972  Japan.................................. 47-1536
Dec. 23, 1972  Japan.................................. 47-1537

[52] U.S. Cl.................................. 424/180; 536/46; 536/103
[51] Int. Cl.².......................................... C07H 3/00
[58] Field of Search............ 260/209, 209 R, 234 R; 424/180

[56] References Cited
UNITED STATES PATENTS

| | | | |
|---|---|---|---|
| 3,553,191 | 1/1971 | Parmerter et al............... | 260/209 D |
| 3,640,847 | 2/1972 | Armbruster et al............ | 260/209 R |
| 3,746,699 | 7/1973 | Kovats........................... | 260/209 R |

*Primary Examiner*—Lewis Gotts
*Assistant Examiner*—Cary Owens
*Attorney, Agent, or Firm*—Bierman & Bierman

[57] ABSTRACT
A compound of the formula:

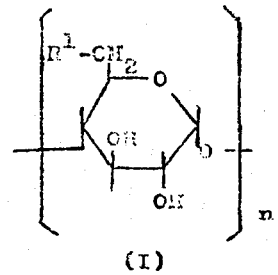

(I)

wherein $R^2$ is mesitylsulfonyl or 2,4,6-triisopropylbenzenesulfonyl and n is an integer of 6 or 7, is reacted with a compound of the formula:

$$R^3-H$$

wherein $R^3$ is amino, methyamino, dimethylamino or azido. When $R^3$ is azido group, the product thus obtained is further subjected to catalytic hydrogenation. A cyclodextrin derivative of the formula:

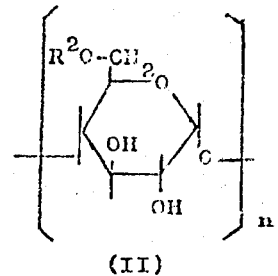

(II)

wherein $R^1$ is amino, methylamino or dimethylamino and n is the same as defined above, is obtained. Said cyclodextrin derivative is useful as a hypolipemic agent.

23 Claims, No Drawings

PROCESS FOR PREPARING A CYCLODEXTRIN DERIVATIVE

This invention relates to a novel process for preparing a cyclodextrin derivative.

The cyclodextrin derivative of the present invention is shown by the following formula:

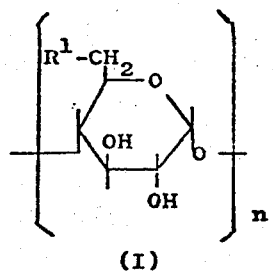

(I)

wherein $R^1$ is amino, methylamino or dimethylamino and $n$ is an integer of 6 or 7, or a pharmaceutically acceptable acid addition salt thereof.

Two methods of preparing poly(6-amino-6-deoxy)-cyclodextrin have been known up to now. For example, S. Umezawa et al disclose that hexa(6-amino-6-deoxy)-cyclohexaglucan($\alpha$-1,4) is prepared by the steps of condensing $\alpha$-dextrin[i.e., cyclohexaglucan($\alpha$-1,4)]with p-toluenesulfonyl chloride to give hexa(6-O-tosyl)-cyclohexaglucan($\alpha$-1,4), reacting said tosyl derivative with sodium azide, and then subjecting the resultant hexa(6-azido-6-deoxy)-cyclohexaglucan($\alpha$-1,4) to catalytic hydrogenation in the presence of platinum dioxide (Bulletin Of The Chemical Society of Japan 41(1968), 464 – 468). Van W. Lautsch et al also discloses that hepta(6-amino-6-deoxy)-cycloheptaglucan($\alpha$-1,4) is prepared by tosylation of $\beta$-dextrin [i.e., cycloheptaglucan($\alpha$-1,4)]with p-toluenesulfonyl chloride, followed by ammonolysis of the resultant hepta(6-O-osyl)-cycloheptaglucan($\alpha$-1,4) (Kolloid Zeitschrift 153(1957), 103 –109). However, the known methods are disadvantageous in a commercial production of poly(6-amino-6-deoxy)-cyclodextrin because of the difficulty in preparing poly(6-O-tosyl)-cyclodextrin in high purity. For example, poly(6-O-tosyl)-cyclodextrin obtained by the known methods is always contaminated with by-products such as poly(2,6-di-O-tosyl)-cyclodextrin, poly(3,6-di-O-tosyl)-cyclodextrin or poly(2,3,6-tri-O-tosyl)-cyclodextrin. Therefore, the known methods inevitably require column-chromatography or other complicated purification techniques prior to and/or after converting poly(6-O-tosyl)-cyclodextrin into poly(6-amino-6-deoxy)-cyclodextrin. Another disadvantage of the known methods is that the reaction of poly(6-O-tosyl)-cyclodextrin with an amine or azide accompanies partial decomposition of the product because said reaction must be carried out at a high temperature(e.g., 140°C) for many hours.

We have now found that the cyclodextrin derivative (I) of the present invention is useful as a hypolipemic agent. We have also found that a novel poly(6-O-arylsulfonyl)-cyclodextrin having the following formula:

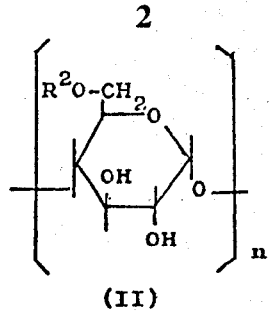

(II)

wherein $R^2$ is mesitylsulfonyl or 2,4,6-triisopropylbenzenesulfonyl and n is the same as defined above, is useful as the intermediate in the synthesis of the cyclodextrin derivative (I). For example, the condensation reaction of a cyclodextrin (e.g., $\alpha$-dextrin, $\beta$-dextrin) with mesitylsulfonyl halide or 2,4,6-triisopropylbenzenesulfonyl halide enables the production of poly(6-0-arylsulfonyl)-cyclodextrin (II) without by-products because of the steric hindrance between mesitylsulfonyl or 2,4, 6-triisopropylbenzenesulfonyl group and the cyclodextrin. The condensation reaction also enables the production of poly(6-arylsulfonyl)-cyclodextrin(II) in a high yield because no byproduct is produced during selective sulfonylation of the cyclodextrin at the 6th-position thereof with mesitylsulfonyl or 2,4, 6-triisopropylbenzenesulfonyl halide. Further, the poly(6-0-arylsulfonyl)-cyclodextrin(II) thus produced can be reacted with an amine or azide under mild conditions thereby giving the cyclodextrin derivative(I) in a high yield.

One object of the present invention is to provide a novel method by which the cyclodextrin derivative (I) can be prepared in a yield of more than 80 % on the basis of $\alpha$- or $\beta$-dextrin employed as the starting material. Another object of the invention is to provide a method by which the cyclodextrin derivative (I) in high purity can be prepared without a complicated purification procedure. The other object is to provide a novel and useful intermediate in the synthesis of the cyclodextrin derivative (I). Still other object is to provide the cyclodextrin derivative (I) which is useful as a hypolipemic agent such as a hypocholesterolemic agent. A further object of the invention is to provide novel cyclodextrin derivatives such as hepta(6-dimethylamino-6-deoxy)-cycloheptaglucan($\alpha$-1,4), hepta(6-methylamino-6-0-deoxy)-cycloheptaglucan($\alpha$-1,4) and hexa (6-dimethylamino-6-deoxy)-cyclohexaglucan($\alpha$-1,4). The cyclodextrin derivatives (I) of the present invention, with the exception of hexa(6-amino-6-deoxy)-cyclohexaglucan($\alpha$-1,4) and hepta(6-amino-6-deoxy)-cycloheptaglucan($\alpha$-1,4), is a novel compound. Still further objects of the present invention will be apparent from the description which follows.

According to the present invention, the cyclodextrin derivative (I) can be prepared by the steps of condensing a cyclodextrin of the formula:

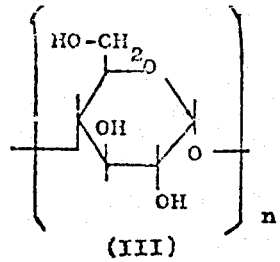

(III)

wherein $n$ is the same as defined above, with an arylsulfonyl halide of the formula:

wherein X is halogen and $R^2$ is the same as defined above, reacting the resultant intermediate (II) with a compound of the formula:

wherein $R^3$ is amino, methylamino, dimethylamino or azido, or an alkali metal salt thereof to give a compound of the formula:

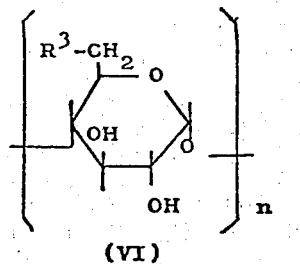

wherein $R^3$ and $n$ are the same as defined above, and when $R^3$ is azido group, further subjecting the compound (VI) to catalytic hydrogenation.

The condensation of the compounds (III) and (IV) can be readily accomplished in the presence of an acid acceptor in a solvent. Preferred examples of the acid acceptor include tertiary organic amines such as triethylamine, pyridine and dimethylaniline, and inorganic alkalies such as sodium carbonate, potassium carbonate and silver oxide. Dimethylformamide, 1,2-dimethoxyethane, dimethylsulfoxide, pyridine and dimethylacetone are suitable as reaction solvents. It is preferred to carry out the reaction at a temperature of −5° to 100°C, especially 30° to 60°C. Under these conditions, the intermediate (II) can be prepared almost quantitatively.

The subsequent reaction of the compounds (II) and (V) can be accomplished under heating at 30° to 100°C, especially at 50° to 80°C. The reaction may be carried out with or without a solvent. For example, when an excess amount of the compound (V) is employed in the reaction, said compound also serves as the reaction solvent. Generally, it is recommended to carry out the reaction in a solvent. Methanol, tetrahydrofuran and 1,2-dimethoxyethane are suitable as the reaction solvent when the compound (v) in the form of free base is employed. On the other hand, when the compound (V) in the form of an alkali metal salt is employed, dimethylformamide and dimethylsulfoxide are suitable as reaction solvents. Since mesitylsulfonyl and 2,4,6-triisopropylbenzenesulfonyl groups employed in the present invention have reactivity higher than tosyl group, the reaction of the invention can be completed in a shorter period of time and at a lower temperature as compared with the reaction time and temperature of the prior art methods (Bull. Chem. Soc. Japan 41, 464; Kolloid Zeitschrift 153, 103).

When $R^3$ is azido($-N_3$) group, the compound (VI) obtained is further subjected to catalytic hydrogenation to give the cyclodextrin derivative (I) in which $R^1$ is amino group. Said hydrogenation is carried out in the presence of a catalyst in a hydrogen atmosphere. Preferred examples of the catalyst include platinum dioxide, platinum and palladium-carbon. A lower alkanol (e.g., methanol, ethanol, propanol, isopropanol) or a mixture of the lower alkanol and water is suitable as the reaction solvent. It is preferred to carry out the reaction at 30° to 80°C.

The cyclodextrin derivative (I) thus obtained shows potent hypocholesterolemic activity and is useful as a hypolipemic agent. For example, the pharmacological activity of the cyclodextrin derivative (I) is shown in the following experiments:

Experiments

A drug tabulated in the following Table was added to a commercial stock diet, and 0.2 w/w %, based on the diet, of cholesterol was added thereto. Male chickens of white Leghorn(Each test group consisting of 10 chickens) were maintained on the diet for 14 days. After the experimental period, the blood was collected by cardiac puncture and total cholesterol in the serum was estimated by "Zak-Henly method" modified by Kitamura [Yasugi et al: The Journal of Chest Diseases vol. 8 (1964), No.2, page 19]. The percentage decrease of total cholesterol in the serum was calculated by the following formula:

$$\text{Decrease \%} = \left(1 - \frac{\text{Mean level of total cholesterol in the medicated group}}{\text{Mean level of total cholesterol in the control group}}\right) \times 100$$

The results are shown in the Table.

TABLE

| Drugs | Amount (w/w%) of the drugs added to the diet | Serum Cholesterol (mg/100 ml) | Decrease (%) |
|---|---|---|---|
| Hexa(6-amino-6-deoxy)-cyclohexaglucan($\alpha$-1,4) | 1.0 | 184 ± 10 | 20 |
| Hepta(6-amino-6-deoxy)-cycloheptaglucan($\alpha$-1,4) | 3.0 | 193 ± 7 | 16 |
| Hepta(6-methylamino-6-deoxy)-cycloheptaglucan($\alpha$-1,4) | 3.0 | 194 ± 7 | 16 |
| Hexa(6-dimethylamino-6-deoxy)-cyclohexaglucan($\alpha$-1,4) | 1.0 | 186 ± 6 | 19 |
| Hepta(6-dimethylamino-6-deoxy)-cycloheptaglucan($\alpha$-1,4) | 3.0 | 215 ± 9 | 7 |
| Control | 0.0 | 231 ± 8 | 0.0 |

For the above-mentioned pharmaceutical use, the cyclodextrin derivative (I) of the present invention can be used either as the free base or a salt thereof. The base and salt thereof are readily convertible from one to the other by conventional manner. Pharmaceutically acceptable salts include, for example, hydrochloride, hydrobromide, perchloride, nitrate, sulfate, phosphate, formate, acetate, pripionate, glycollate, lactate, pyruvate, oxalate, malonate, succinate, maleate, fumarate, malate, citrate, tartarate, sulfanilate, aspartate or glutamate. The cyclodextrin derivative (I) may be used in the form of a pharmaceutical preparation for enteral administration. The daily dose of the cyclodextrin derivative for a pharmaceutical use may be 0.5 to 50 g, especially 5 to 30 g. Further, the cyclodextrin derivative (I) of the present invention may be used in conjunction or admixture with a pharmaceutical excipient which is suitable for enteral administration. The excipient selected should be the one that does not react with the cyclodextrin derivative (I) of the present invention. Suitable excipients include, for example, gelatin, lactose, glucose, sodium chloride, starch, magnesium stearate, talcum, vegetable oil, benzyl alcohol and gums. Other known medicinal excipients may be employed. The pharmaceutical preparation may be a solid dosage form such as a tablet, a coated tablet, a pill or a capsule, or a liquid dosage form such as a solution, a suspension or an emulsion.

Practical and presently-preferred embodiments of the present invention are illustratively shown in the following Examples.

EXAMPLE 1

5 g of β-dextrin are dissolved in 50 ml of pyridine, and 7.35 g of mesitylsulfonyl chloride are added thereto. The solution is stirred at room temperature for 24 hours. The reaction solution is poured into ice-water, and the white precipitate thus obtained is collected by filtration. The precipitate is washed with water, dried and then recrystallized from methanol. 9.7 g of hepta(6-O-mesitylsulfonyl)-cycloheptaglucan(α-1,4) are obtained. M.p. 182° – 184°C. Yield: 91%

Infrared absorption spectrum: liquid paraffin: 1600, 1190, 1170 cm$^{-1}$ ν max.

Rf-value: 0.75(ethylacetate : methanol : benzene = 6 : 2 : 1)

Analysis calculated for $C_{105}H_{140}O_{49}S_7 \cdot 4H_2O$ C, 50.79; H, 6.01; S, 9.04, Found C, 50.93; H, 5.90; S, 8.91.

4.8 g of hepta (6-O-mesitylsulfonyl)-cycloheptaglucan (α-1,4) are dissolved in 50 ml of dimethylformamide, and 2.6 g of sodium azide are added thereto. The solution is heated at 90°C in a sealed vessel for 7 hours. After cooling, the solution is poured into ice-water, and the crystalline precipitate is collected by filtration. The precipitate is recrystallized from dimethylformamide and methanol, successively. 2.3 g of hepta (6-azido-6-deoxy)-cycloheptaglucan (α-1, 4) are obtained. M.p. 230° – 235°(decomp.) Yield: 88.5%

Infrared absorption spectrum: liquid paraffin: 2100 cm$^{-1}$ (-N$_3$) ν max

Analysis calculated for $C_{42}H_{63}O_{28}N_{21}$ C, 38.50; H, 4.85; N, 22.45; Found C, 38.77; H, 4.99; N, 21.85

A solution of one g of hepta (6-azido-6-deoxy)-cycloheptaglucan(α-1,4) in 50 ml of 80% aqueous methanol is subjected to catalytic hydrogenation in the presence of 300 mg of platinum dioxide in a hydrogen atmosphere. After the reaction is completed, the solution is filtered to remove the catalyst. The filtrate thus obtained is concentrated to dryness. 580 mg of hepta(6-amino-6-deoxy)-cycloheptaglucan(α-1,4) are obtained as powder. M.p. 220° – 230°C. Yield: 68%

Infrared absorption spectrum: liquid paraffin: 1570 cm$^{-1}$(—NH—) ν max.

Analysis calculated for $C_{42}H_{77}O_{28}N_7 \cdot 4H_2O$; C, 42.03; H, 7.31; N, 8.17; Found C, 42.81; H, 6.98; N, 7.76.

EXAMPLE 2

92 g of hepta (6-O-mesitylsulfonyl)-cycloheptaglucan,α-1,4) prepared in the same manner as described in Example 1 are dissolved in 1.5 liter of methanol, and 350 g of a methanol solution containing 20 w.v % of dimethylamine are added thereto. The mixture is heated at 100°C in a sealed vessel for 24 hours. Then, the mixture is evaporated to remove solvent. The residue thus obtained is dissolved in water, and the aqueous solution is passed through the column of a strong anion exchange resin (manufactured by Rohm l Haas Co. under the trade name "Amberlite IRA-410"). The effluent is adjusted to pH 6 with 5 % hydrochloric acid and then lyophilized. 53 g of hepta(6-dimethylamino-6-deoxy)-cycloheptaglucan(α-1,4) hydrochloride are obtained as powder. M.p. 195° – 205°C(decomp.) Yield: 87 %

Analysis calculated for $C_{56}H_{112}O_{28}N_7Cl_7 \cdot 3H_2O$; C, 41.17; H, 7.28; N, 6.00; Cl, 15.19; Found C, 41.52; H, 7.07; N, 5.65; Cl, 15.34.

EXAMPLE 3

59 g of α-dextrin are dissolved in 500 ml of pyridine, and a solution of 88 g of mesitylsulfonyl chloride in 200 ml of pyridine is added thereto under cooling at 0° to 5°C. The solution is stirred at room temperature for 24 hours. Then, the reaction solution is poured into ice-water, and the precipitate thus obtained is collected by filtration. The precipitate is washed with water, dried and then recrystallized from methanol. 100 g of hexa(6-O-mesitylsulfonyl)-cyclohexaglucan(α-1,4) are obtained. M.p. 190° – 195°C (decomp.) Yield: 79.7%

Infrared absorption spectrum: liquid paraffin: 1600, 1195, 1185 cm$^{-1}$ ν max.

Analysis calculated for $C_{90}H_{120}O_{42}S_6 \cdot 2H_2O$; C, 51.45; H, 5.94; S, 9.15; Found C, 51.62; H, 5.89; S, 8.49.

4g of hexa (6-O-mesitylsulfonyl)-cyclohexaglucan(α-1,4) are dissolved in 50 ml of a methanol solution containing 20 w/v % of dimethylamine. The solution is heated at 90°C in a sealed vessel for 3 days. Then, the reaction solution is passed through the column of a strong anion exchange resin (manufactured by Rohm & Haas Co. under the trade name "Amberlite IRA-400"). The effluent is evaporated under reduced pressure to remove solvent. 23 g of pale yellow powder thus obtained is recrystallized from methanol and acetone, successively. 1.9 g of hexa (6-dimethylamino-6-deoxy)-cyclohexaglucan(α-1,4) are obtained. M.p. 300°C(decomp.) Yield: 86.5 %

Analysis calculated for $C_{48}H_{90}O_{24}N_6$; C, 50.78; H, 7.99; N, 7.40; Found C, 50.48; H, 7.93; N, 6.95.

EXAMPLE 4

Hepta (6-O-mesitylsulfonyl)-cycloheptaglucan(α-1,4) is prepared in the same manner as described in Example 1. 200 g of hepta (6-O-mesitylsufonyl)-cycloheptaglucan(α-1,4) are suspended in 1500 ml of a methanol solution containing 150 g of methylamine, and the suspension is heated at 60° to 70°C in a sealed vessel for 50 hours. After cooling, the suspension is passed through the column of a strong anion exchange resin (manufactured by Rohm & Haas Co. under the trade name "Amberlite IRA-410"). The effluent is evaporated to remove solvent. The residue thus obtained is dissolved in 500 ml of water, and the aqueous solution is adjusted to pH 5 with diluted hydrochloric acid. The solution is treated with activated carbon and then lyophilized. 75 g of hepta(6-methylamino-6-deoxy)-cycloheptaglucan($\alpha$-1,4) hydrochloride are obtained as pale yellow powder.

M.p. 192° – 200°C. Yield: 61.3 %

Analysis calculated for $C_{49}H_{91}O_{28}N_7 \cdot 7HCl$; C, 6.62; Cl, 16.75; Found C, 6.31; Cl, 16.68.

EXAMPLE 5

4.86 g of $\beta$-dextrin are dissolved in 100 ml of pyridine, and 10 g of 2,4,6-triisopropylbenzenesulfonyl chloride are added thereto. The solution is stirred at room temperature for 72 hours. The reaction solution is poured into ice-water, and the precipitate is collected by filtration. The precipitate is recrystallized from methanol. 5.90 g of hepta [6-O-(2,4,6-triisopropylbenzenesulfonyl)]-cycloheptaglucan($\alpha$-1,4) are obtained. M.p. 195° – 196°C(decomp.) Yield: 45.4 %

Infrared absorption spectrum: liquid paraffin: 3350, 1600, 1180, 1155, $\nu$ max. 1055, 1035 cm$^{-1}$ Analysis calculated for $C_{147}H_{245}O_{49}S_7$; S, 7.50; Found S, 7.08;

10 g hepta [6-O-(2,4,6-triisopropylbenzenesulfonyl)]-cycloheptaglucan($\alpha$-1,4) are suspended in 100 ml of a methanol solution containing 10 g of methylamine, and the suspension is heated at 60° to 70°C in a sealed vessel for 30 hours. Then, the suspension is treated in the same manner as described in Example 4. 4 g of hepta(6-methylamino-6-deoxy)-cycloheptaglucan ($\alpha$-1,4) hydrochloride are obtained as pale yellow powder. M.p. 193° – 200°C Yield: 82 %

EXAMPLE 6

5 g of $\alpha$-dextrin are dissolved in 160 ml of pyridine, and 10 g of 2,4,6-triisopropylbenzenesulfonyl chloride are added thereto. The solution is stirred at room temperature for 120 hours. The reaction solution is poured into ice-water, and the precipitate thus obtained is collected by filtration. Then, the precipitate is recrystallized from methanol. 6 g of hexa[6-O-(2,4,6-triisopropylbenzenesulfonyl)]-cyclohexaglucan ($\alpha$-1,4) are obtained. M.p. 200° – 202°C(decomp.) Yield: 45 %

Infrared absorption spectrum: liquid paraffin: 3350, 1600, 1180, 1155, 1035 cm$^{-1}$ $\nu$ max.

Analysis calculated for $C_{126}H_{210}O_{42}S_6$; S, 7.50; Found S, 6.98.

What we claim is:

1. A cyclodextrin derivative of the formula:

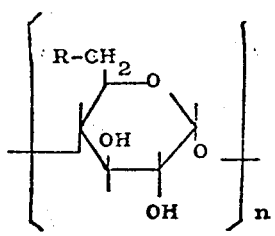

wherein R is methylamino or dimethylamino and $n$ is an integer of 6 or 7, or a pharmaceutically acceptable acid addition salt thereof.

2. The cyclodextrin derivative as claimed in claim 1, wherein R is methylamino and $n$ is an integer of 7.
3. The cyclodextrin derivative as claimed in claim 1, wherein R is dimethylamino and $n$ is an integer of 6.
4. The cyclodextrin derivative as claimed in claim 1, wherein R is dimethylamino and $n$ is an integer of 7.
5. The cyclodextrin derivative as claimed in claim 1, wherein said pharmaceutically acceptable acid addition salt is the hydrohalide.
6. A therapeutic composition which comprises pharmaceutically effective amount of a cyclodextrin derivative of formula:

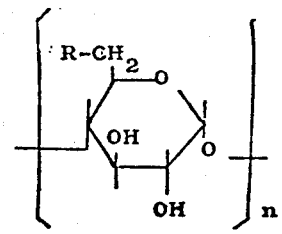

wherein R is methylamino or dimethylamino and $n$ is an integer of 6 or 7, or a pharmaceutically acceptable acid addition salt thereof, and a pharmaceutically acceptable carrier therefor.

7. A process for preparing a cyclodextrin derivative of the formula:

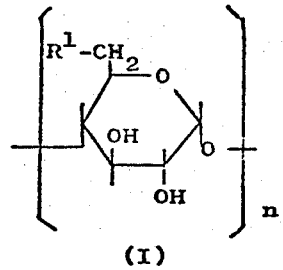

wherein $R^1$ is amino, methylamino or dimethylamino and $n$ is an integer of 6 or 7, which consists essentially of the steps of condensing a cyclodextrin of the formual:

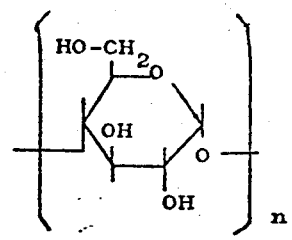

wherein $n$ is the same as defined above, with an arylsulfonyl halide of the formula:

$$R^2—X \qquad (IV)$$

wherein $R^2$ is mesitylsulfonyl or 2,4,6-triisopropylbenzenesulfonyl and X is halogen, in the presence of an acid acceptor to give a compound of the formula:

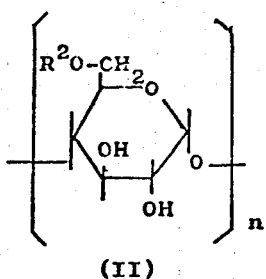

wherein $R^2$ and $n$ are the same as defined above, and heating a mixture of the compound (II) and a compound of the formula:

$$R^3- H \qquad (V)$$

wherein $R^3$ is amino, methylamino, dimethylamino or azido, or an alkali metal salt thereof at a temperature of 30° to 100°C to give a compound of the formula:

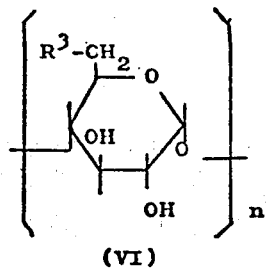

wherein $R^3$ and $n$ are the same as defined above, and when $R^3$ is azido, and further subjecting the compound (VI) to catalytic hydrogenation in the presence of a catalyst in a hydrogen atmosphere.

8. The process according to claim 7, wherein the condensation of the compounds (III) and (IV) is carried out at −5° to 100°C, and the catalytic hydrogenation is carried out at 30° to 80°C in a hydrogen atmosphere.

9. The process according to claim 7, wherein the condensation of the compounds (III) and (IV) is carried out at −5° to 100°C, the acid acceptor is selected from the group consisting of triethylamine, pyridine, dimethylaniline, sodium carbonate, potassium carbonate and silver oxide, and the catalytic hydrogenation is carried out at 30° to 80°C in a hydrogen atmosphere in the presence of a catalyst selected from the group consisting of platinum dioxide, platinum and palladium-carbon.

10. A process for preparing a cyclodextrin derivative of the formula:

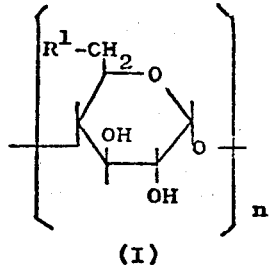

wherein $R^1$ is amino, methylamino or dimethylamino and $n$ is an integer of 6 or 7, which consists essentially of the steps of condensing a cyclodextrin of the formula:

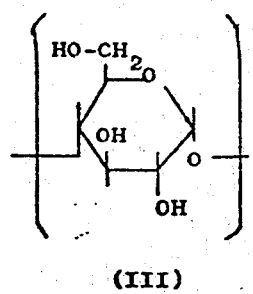

wherein $n$ is the same as defined above, with an arylsulfonyl halide of the formula:

$$R^2 - X \qquad (IV)$$

wherein $R^2$ is mesitylsulfonyl or 2,4,6-triisopropylbenzenesulfonyl and X is halogen, in the presence of an acid acceptor to give a compound of the formula:

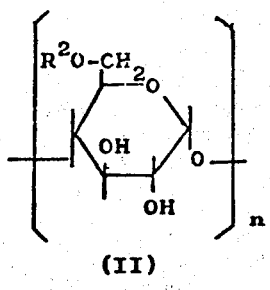

wherein $R_2$ and $n$ is the same as defined above, and heating a mixture of the compound (II) and a compound of the formula:

$$R^4- H \qquad (VII)$$

wherein $R^4$ is amino, methylamino or dimethylamino, at a temperature of 30° to 100°C.

11. The process according to claiim 10, wherein the condensation of the compounds (III) and (IV) is carried out at −5° to 100°C.

12. The process according to claim 10, wherein the condensation of the compounds (III) and (IV) is carried out at 30° to 60°C, and the acid acceptor is selected from the group consisting of triethylamine, pyridine, dimethylaniline, sodium carbonate, potassium carbonate and silver oxide.

13. A process for preparing a cyclodextrin derivative of the formula:

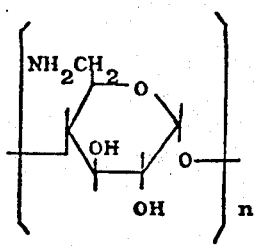

wherein $n$ is an integer of 6 or 7, which consists essentially of the steps of condensing a cyclodextrin of the formula:

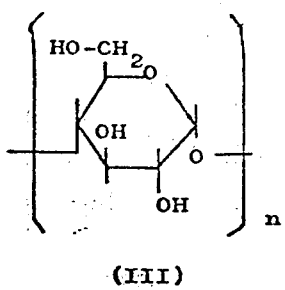

(III)

wherein $n$ is the same as defined above, with an arylsulfonyl halide of the formula:

$$R^2-X \qquad (IV)$$

wherein $R^2$ is mesitylsulfonyl or 2,4,6-triisopropylbenzenesulfonyl and X is halogen, in the presence of an acid acceptor to give a compound of the formula:

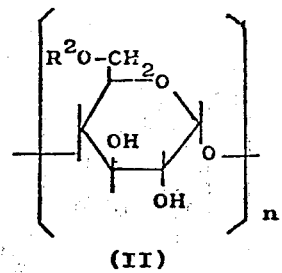

(II)

wherein $R^2$ and $n$ are the same as defined above, heating a mixture of the compound (II) and an alkali metal azide at a temperatue of 30° to 100°C to give a compound of the formula:

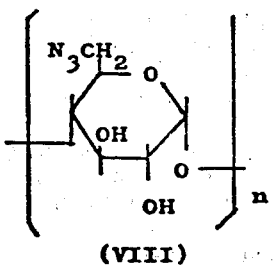

(VIII)

wherein $n$ is the same as defined above, and subjecting the compound (VIII) to catalytic hydrogenation in the presence of a catalyst in a hydrogen atmosphere 14. The process according to claim 13, wherein the condensation of the compounds (III) and (IV) is carried out at −5° to 100°C, and the catalytic hydrogenation is carried out at 30° to 80°C in a hydrogen atmosphere.

15. The process according to claim 13, wherein the condensation of the compounds (III) and (IV) is carried out at 30° to 60°C, the acid acceptor is selected from the group consisting of triethylamine, pyridine, dimethylaniline, sodium carbonate, potassium carbonate and silver oxide, and the catalytic hydrogenation is carried out at 30° to 80°C in a hydrogen atmosphere in the presence of a catalyst selected from the group consisting of platinum dioxide, platinum and palladium-carbon.

16. An intermediate of the formula:

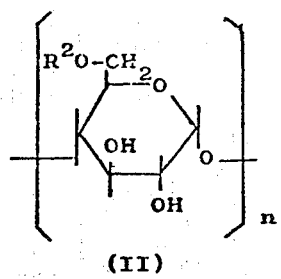

(II)

wherein $R^2$ is mesitylsulfonyl or 2,4,6-triisopropylbenzenesulfonyl, and $n$ is an integer of 6 or 7.

17. The intermediate as claimed in claim 16, wherein $R^2$ is mesitylsulfonyl and $n$ is an integer of 6.

18. The intermediate as claimed in claim 16, wherein $R^2$ is mesitylsulfonyl and $n$ is an integer of 7.

19. The intermediate as claimed in claim 16, wherein $R^2$ is 2,4,6-triisopropylbenzenesulfonyl and $n$ is an integer of 6.

20. The intermediate as claimed in claim 16, wherein $R^2$ is 2,4,6-triisopropylbenzenesulfonyl and $n$ is an integer of 7.

21. The process of claim 7 in which compound (I) is converted into a pharmaceutically acceptable acid addition salt.

22. The process of claim 10 in which compound (I) is converted into a pharmaceutically acceptable acid addition salt.

23. The process of claim 13 in which compound (I) is converted into a pharmaceutically acceptable acid addition salt.

* * * * *